US009055265B2

(12) United States Patent
Shintani et al.

(10) Patent No.: US 9,055,265 B2
(45) Date of Patent: Jun. 9, 2015

(54) ACCESSIBILITY IMPROVEMENT FOR HEARING IMPAIRED

(71) Applicants: Peter Rae Shintani, San Diego, CA (US); Kazumoto Kondo, San Diego, CA (US)

(72) Inventors: Peter Rae Shintani, San Diego, CA (US); Kazumoto Kondo, San Diego, CA (US)

(73) Assignee: Sony Corporation, Tokyo (JP)

( * ) Notice: Subject to any disclaimer, the term of this patent is extended or adjusted under 35 U.S.C. 154(b) by 272 days.

(21) Appl. No.: 13/707,902

(22) Filed: Dec. 7, 2012

(65) Prior Publication Data

US 2014/0160362 A1    Jun. 12, 2014

(51) Int. Cl.
*H04R 1/10*     (2006.01)
*H04N 5/60*     (2006.01)
*H04N 21/41*    (2011.01)
*H04N 21/439*   (2011.01)

(52) U.S. Cl.
CPC .......... *H04N 5/607* (2013.01); *H04N 21/4122* (2013.01); *H04N 21/439* (2013.01)

(58) Field of Classification Search
None
See application file for complete search history.

(56) References Cited

U.S. PATENT DOCUMENTS

| | | | |
|---|---|---|---|
| 5,655,025 A | 8/1997 | Kim et al. | |
| 7,167,571 B2 | 1/2007 | Bantz et al. | |
| 2002/0012435 A1* | 1/2002 | Colegrave et al. | 381/74 |
| 2003/0009694 A1* | 1/2003 | Wenocur et al. | 713/201 |
| 2003/0064746 A1* | 4/2003 | Rader et al. | 455/550 |
| 2004/0081099 A1* | 4/2004 | Patterson et al. | 370/241 |
| 2004/0125964 A1* | 7/2004 | Graham et al. | 381/74 |
| 2004/0247139 A1* | 12/2004 | Wang | 381/74 |
| 2005/0260978 A1* | 11/2005 | Rader et al. | 455/418 |
| 2007/0142942 A1* | 6/2007 | Hyatt | 700/94 |
| 2007/0296818 A1 | 12/2007 | Porwal | |
| 2009/0262955 A1* | 10/2009 | Kimura | 381/107 |
| 2010/0166237 A1* | 7/2010 | Leeper | 381/309 |
| 2010/0183175 A1* | 7/2010 | Chen et al. | 381/309 |
| 2011/0128452 A1* | 6/2011 | Kim et al. | 348/738 |
| 2011/0150234 A1* | 6/2011 | Johnson et al. | 381/74 |
| 2014/0153735 A1* | 6/2014 | Fujioka | 381/74 |

* cited by examiner

*Primary Examiner* — Brenda Bernardi
(74) *Attorney, Agent, or Firm* — Miller Patent Services; Jerry A. Miller

(57) ABSTRACT

A television audio device has a multiple channel television audio system having provisions for providing multiple channel audio to a speaker system and multiple channel audio for receipt by a multiple channel headphone system. A switch is configured to detect operation of the multiple channel headphone system. A processor is selectively programmable to configure the multiple channel television audio system to provide a monaural audio signal to all channels of the multiple channel headphone system when the multiple channel headphone system is detected to be in operation. This abstract is not to be considered limiting, since other embodiments may deviate from the features described in this abstract.

27 Claims, 4 Drawing Sheets

ACCESSIBILITY IMPROVEMENT FOR HEARING IMPAIRED

COPYRIGHT AND TRADEMARK NOTICE

A portion of the disclosure of this patent document contains material which is subject to copyright protection. The copyright owner has no objection to the facsimile reproduction of the patent document or the patent disclosure, as it appears in the Patent and Trademark Office patent file or records, but otherwise reserves all copyright rights whatsoever. Trademarks are the property of their respective owners.

BACKGROUND

The Advanced Communications Services Act in the United States has requirements to address various disabilities, one of which is hearing. The Act requires that television equipment providers take steps to try to improve the presentation of audio to a person who has a hearing disability.

BRIEF DESCRIPTION OF THE DRAWINGS

Certain illustrative embodiments illustrating organization and method of operation, together with objects and advantages may be best understood by reference to the detailed description that follows taken in conjunction with the accompanying drawings in which.

DETAILED DESCRIPTION

Figure 1:
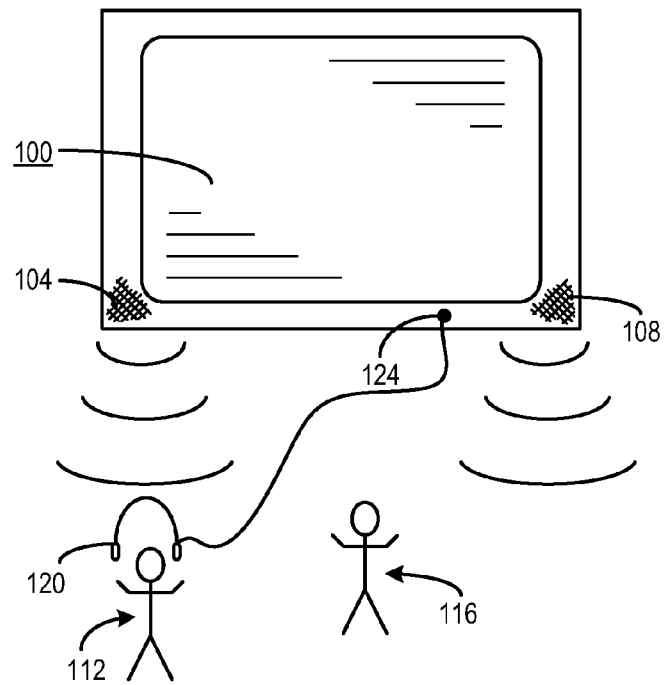
FIG. 1 depicts an example television system that is in concurrent use by both an individual with a hearing impairment and one that is not hearing impaired consistent with certain embodiments of the present invention.

While this invention is susceptible of embodiment in many different forms, there is shown in the drawings and will herein be described in detail specific embodiments, with the understanding that the present disclosure of such embodiments is to be considered as an example of the principles and not intended to limit the invention to the specific embodiments shown and described. In the description below, like reference numerals are used to describe the same, similar or corresponding parts in the several views of the drawings.

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically. The term "program" or "computer program" or similar terms, as used herein, is defined as a sequence of instructions designed for execution on a computer system. A "program", or "computer program", may include a subroutine, a function, a procedure, an object method, an object implementation, in an executable application, an applet, a servlet, a source code, an object code, a script, a program module, a shared library/dynamic load library and/or other sequence of instructions designed for execution on a computer system.

The term "program", as used herein, may also be used in a second context (the above definition being for the first context). In the second context, the term is used in the sense of a "television program". In this context, the term is used to mean any coherent sequence of audio video content such as those which would be interpreted as and reported in an electronic program guide (EPG) as a single television program, without regard for whether the content is a movie, sporting event, segment of a multi-part series, news broadcast, etc. In this discussion, the use of the term "Program" is generally consistent with that of the MPEG-2 Systems standard (ISO/IEC 13818-1). An MPEG-2 Program has the associated Elementary Stream components, such as for example one video Elementary Stream and one or more audio Elementary Streams. The term may also be interpreted to encompass commercial spots and other program-like content which may not be reported as a program in an electronic program guide.

Reference throughout this document to "one embodiment", "certain embodiments", "an embodiment" or similar terms means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

As noted previously, the Advanced Communications Services Act in the United States has requirements to address various disabilities, one of which is hearing. The Act requires that television equipment providers take steps to try to improve the presentation of audio to a person who has a hearing disability.

It is noted that many hearing disabilities are asymmetric. The hearing loss may be restricted to one ear, or may be more or less severe in one ear than the other. Or, the hearing loss in one ear may have different characteristics than those of the other ear.

Such asymmetry presents a problem if the user uses a standard stereo headphone. In this case under normal circumstances the left or right audio channel would only be presented to the left and right ear respectively. If the audio information such as speech is restricted mainly to just one side, the user may or may not be able to hear at least a portion of the dialog. In any event, the stereo separation may inhibit the user with an asymmetrical hearing loss from getting a true representation of the full audio program.

In accord with certain embodiments consistent herewith, the television device is provided with a user selectable option which would combine the stereo program into a monaural program when an external headphone is plugged in or otherwise activated and a monaural option has been selected. This avoids loss of channel specific information to user when headphone or earphones are used.

While the present discussion has thus far focused on left and right stereo program content, the concept is equally applicable to multi channel systems such as 5.1 or other systems. In such systems, the dialog is often contained in the center channel. Of course this center channel is normally provided into the L and R channels presented to an external headphone jack or other connector or connection (including wireless connections such as BlueTooth™. But in accord with the present teachings, the Left and Right channel mix is converted to a monaural audio signal for application to the external headphone/earphone plug when this option is activated by the user. Similar functionality can be applied to any other audio output that might find use by those having hearing impairment.

In the case above, this conversion to monaural is for purposes of the earphones and the multi-channel television audio remains unaffected so that other users who are not hearing impaired can enjoy the multi-channel audio. In addition, since asymmetrical hearing impairments can present in many ways, it is also consistent with the present teachings to enable the user to adjust the equalization in terms of volume and frequency response for each ear.

Since headphones can be used by multiple users, an identification (ID) can be assigned to each user so that by plugging into a separate headphone jack, making an on-screen selection or using a different wireless identification for each headphone, the user or users with hearing impairments can have audio individually delivered to their headphone in a manner that most closely adapts the audio to their particular hearing impairment.

Turning now to FIG. 1, an example of a television set 100 having internal speakers 104 and 108 used in accord with embodiments consistent herewith is depicted. In this example, it is noted that two viewers 112 and 116 may wish to watch the same television set 100 simultaneously. In this example, assume that viewer 112 is hearing impaired and viewer 116 is not. In such a case, headphones 120 may be employed by viewer 112 in order to separately control the volume so as not to have to turn the volume to a level which is uncomfortable for viewer 116. However, in the case of viewer 112 being asymmetrically hearing impaired, assuming a stereo signal to the headphones, the ear with poorest hearing may not be able to hear all of the program material (e.g., dialog that is mostly or fully directed to the more impaired ear.

In accord with implementations consistent with the present teachings, user 112 should be able to selectively separately control the equalization in terms of volume and possibly in terms of frequency response of the headphones independently for each ear and selectively cause multiple channel audio to be converted to monaural (mono) for the headphones. In this manner, hearing impaired user 112 is able to hear the full program material in a more enjoyable manner. Moreover, user 116 is not burdened with the overall volume of audio from speakers 104 and 108 being set uncomfortably loud.

The present discussion in connection with FIG. 1 presumes that the headphones 120 are directly or indirectly (e.g. for a wireless connection) plugged into a headphone jack 124, where the term "headphone jack" as used herein is merely and example of one type of connection and should be broadly interpreted to be an example of any mechanism, wired or wireless connection, that can be used to ultimately drive a set of headphones and which can provide a suitable indication to the television audio device that the headphones are active.

Figure 2:
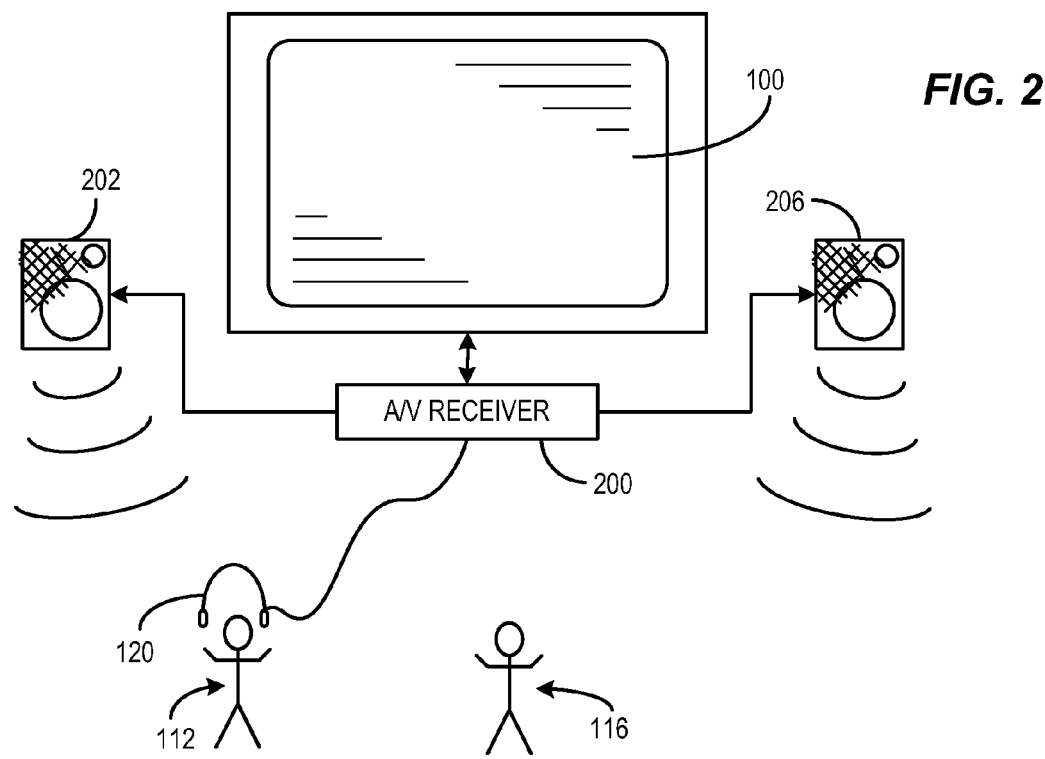
FIG. 2 depicts an example television system that is in concurrent use by both an individual with a hearing impairment and one that is not hearing impaired utilizing an audio/video receiver system consistent with certain embodiments of the present invention.

Referring to FIG. 2, this illustration is provided to depict that equivalently the audio system is not integral with the television set and the headphones 120 can be connected to an audio/video receiver 200 or a television set to accomplish the same function described herein. In this illustration, the audio/video receiver 200 is depicted driving a pair of stereo speakers 202 and 206 for convenience, but it will be clearly understood that the audio/video receiver (or indeed the television set) may be provided with a multiple channel receiver including, for example a 5.1 channel audio system. Moreover, while headphones are most conventionally designed to be stereo in function, the present teachings contemplate use of headphones designed to replicate multiple channel surround sound effects without limitation.

While FIGS. 1-2 only depict a single user with headphones, multiple headphones (used individually or simultaneously) can be accommodated with separate jacks that are individually tailored to the particular user. Also, while these figures depict wired headphones using a connection to a headphone jack, wireless headphones using any sort of connection may also be used. In each case, each user can have a separate profile that accounts for their individual hearing equalization so that the sound delivered to a particular set of headphones is tailored to the individual for whom the profile is tailored.

Figure 3:
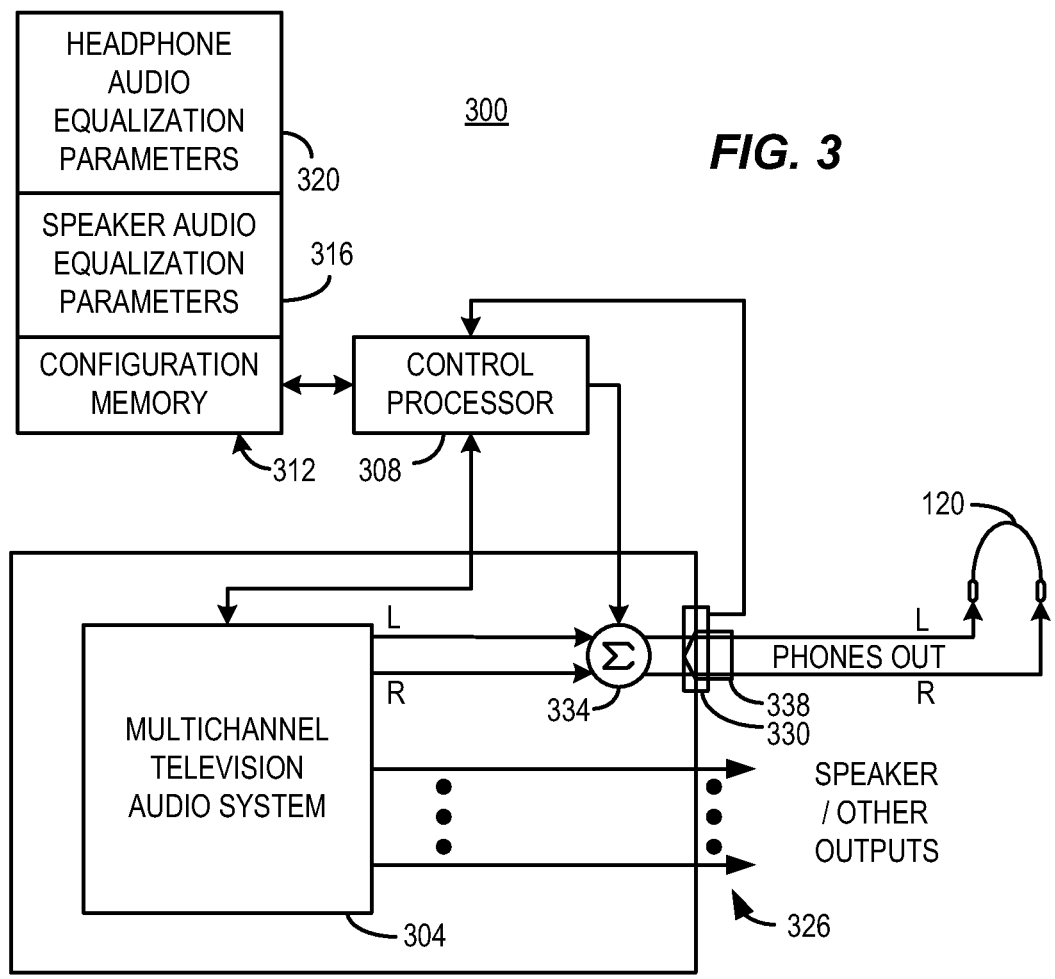
FIG. 3 is an example block diagram of a television audio system consistent with certain embodiments of the present invention.

Turning now to FIG. 3, a block diagram depicts the operation of an example implementation of the television audio system 300. In system 300, a multi-channel television audio system 304, whether forming a part of the television set or as an audio/video receiver coupled to the television set is controlled by a control processor 308 where the control processor 308 can either be a part of the audio system or a part of the television system and can exercise control in any configuration over the operation of the signals as processed by the multi-channel audio system. The processor (or processors) 308 operate under control of control programs using configurations stored in configuration memory 312 including, but not limited to, operational configuration information, speaker audio equalization parameters 316 and headphone audio equalization parameters 320.

In accord with a user selectable configuration, the processor 308, with reference to configuration memory 312 determines how to present audio to loudspeaker outputs and other outputs depicted as 326 and to headphone jack or other wired or wireless connection 330. For ease of illustration, an audio mixer 334 is shown as separate from the audio system 304 which operates under control of the processor 308 to mix and/or equalize the headphone audio directed to headphone jack 330. In a conventional switched ¼ inch stereo headphone jack, the switch can provide input to the control processor so that the processor 308 is aware of when headphones 120 is plugged in with plug 338.

If the configuration information indicates that the system is to combine the stereo (in this example) signals to the headphones, mixer 334 is directed to combine and equalize the headphone signals so that both left and right (L and R) signals are monaural containing a combination of left and right channels (or more generically, a combination of all channels in a multiple channel system), but in certain implementations, each of the left and right channels can be equalized for volume and/or frequency response.

While in this example, the interface is a plug and jack, any suitable interface, including wireless interface, that conveys to the control processor that headphones are connected is an equivalent and the terms plug and jack should be interpreted accordingly.

Figure 4:
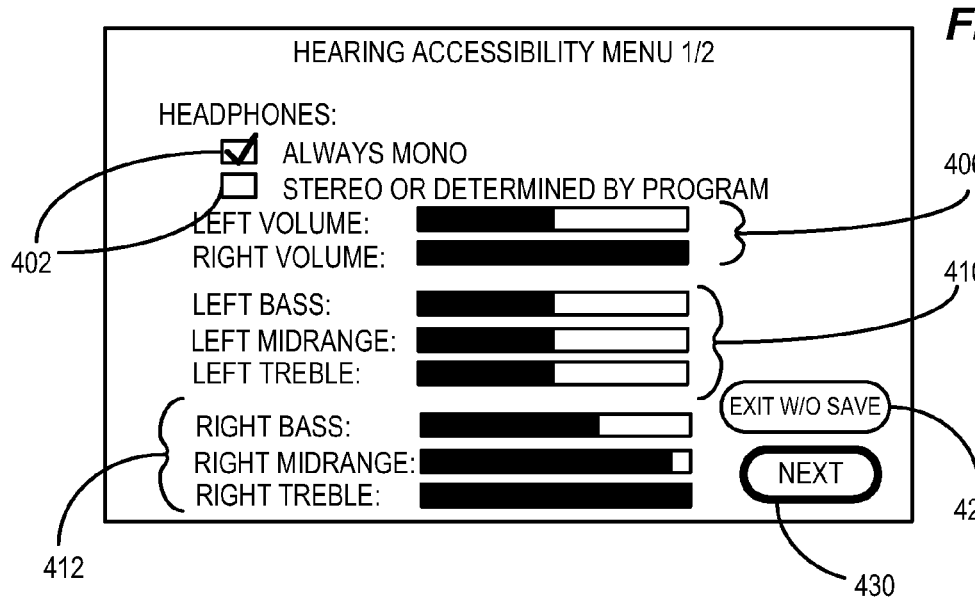
FIG. 4 is a first page of an example menu system consistent with certain embodiments of the present invention.

With reference to FIG. 4, an example of a first page 400 of a user interface displayed on the television set display is depicted. This user interface can be retrieved as a part of the television initialization, as a part of the television menu system or via direct access from a control on the remote control or the like and provides for the user to configure the television for enhanced hearing accessibility. In this non-limiting example that for simplicity assumes a single user of headphones, the user is presented with various options that can be navigated and activated in a conventional manner using a remote control or pointer device. At 402, the user can elect to either have the headphones always present monaural (mono) information to both ears (i.e., a combination of all channels), or stereo (or other multiple channel format) to both ears as determined by the programming (which in some cases may be monaural). In certain embodiments, the user can also make equalization selections that are independent of speaker equalization in order to partially compensate for various types of hearing loss. At 406, the user is able to individually adjust the relative or absolute volume to the left and right ears, even though the same monaural signals may be going to both ears. Similarly, in certain embodiments, the user may select frequency response equalization shown in this example as left 410 and right 412 bass, midrange and treble controls respectively. It will be clear that more or less equalization functions can be provided, and the present depiction is for illustrative purposes only.

In this example, the equalization is depicted such that the user has relatively unimpaired hearing in the left ear, but a much higher degree of impairment in the right ear, and particularly in the higher frequency ranges.

When the user is completed with selections from 400, the menu can be exited without saving to the configuration memory if desired (i.e., the process aborted) by selecting button 420, or can move to the second page using the "next" button 430 (shown highlighted as one form of cursor representation).

Figure 5:
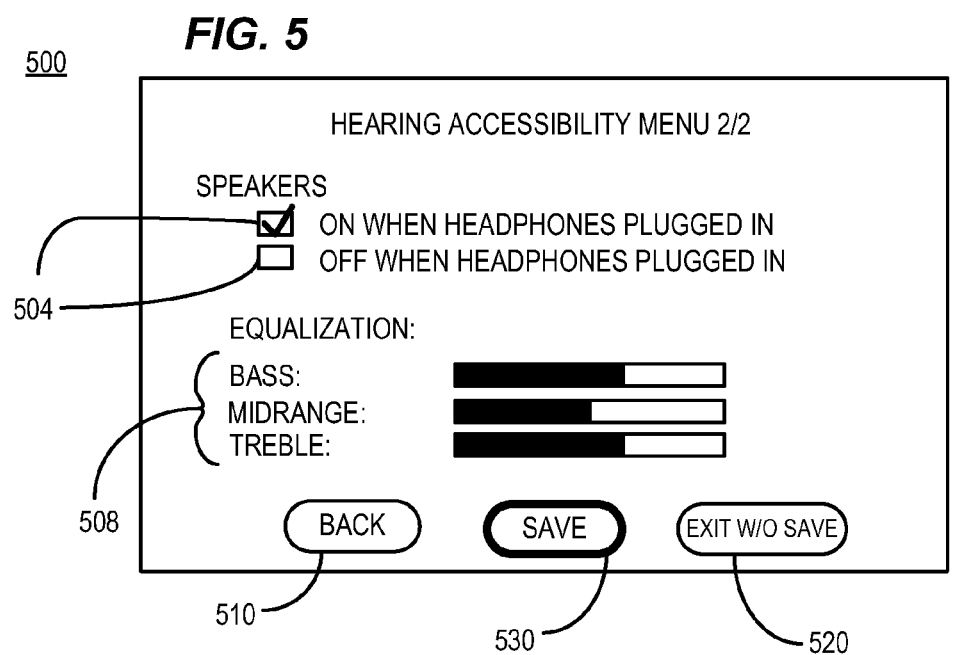
FIG. 5 is a second page of an example menu system consistent with certain embodiments of the present invention.

In this example implementation if the "next" button 430 is selected, hearing accessibility menu 500 of FIG. 5 appears and the user can continue with selections that determine at 504 whether or not the speakers are to remain on or be turned off if the headphones are connected. Additionally, for illustrative purposes, the equalization for the speakers can be separately controlled at 508 from the equalization for the headphones. The prior menu 400 can be accessed with "back" button 510, or the user can abort by exiting without saving using button 520 or can save the information to configuration memory using "save" button 530 (shown highlighted).

It should be carefully noted that the illustrated configuration for making the selections as shown in 400 and 500 are depicted by way of example in a possibly simplified manner for illustrative purposes. Many variations in presentation of such user selections are possible without deviating from the present teachings.

Figure 6:
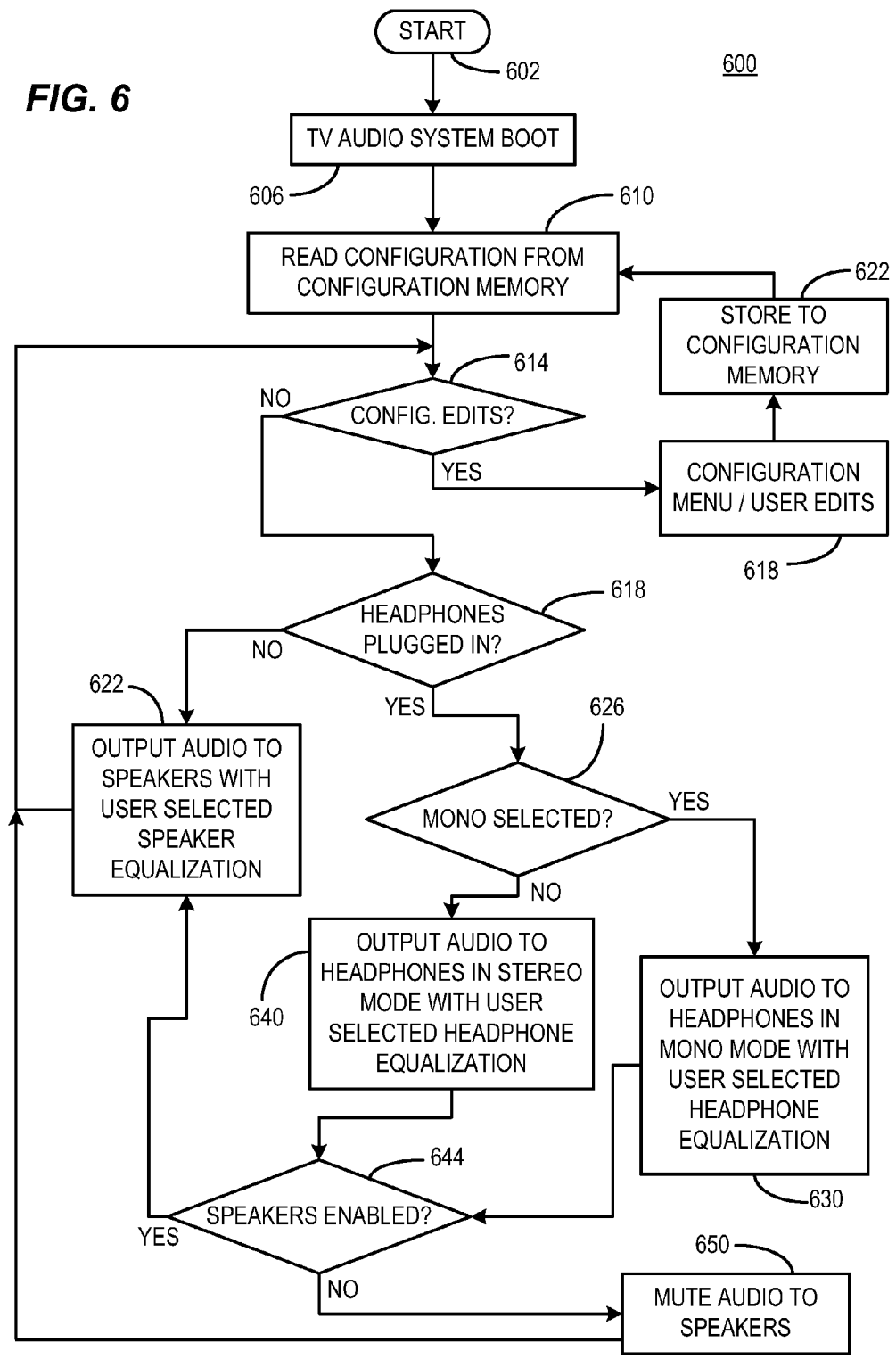
FIG. 6 is an example process depicted as a block diagram consistent with certain embodiments of the present invention.

An example process 600 is depicted in FIG. 6, starting at 602 where after a TV audio system of any suitable kind is booted at 606, the configuration memory 312 is read to obtain settings and other information such as equalizer parameters for one or more headphone users based on their individual profile at 610. If multiple users of headphones are present, the audio system can be configured to either turn on or off the conventional speakers according to any rule that can be selected from an additional menu selection (not shown). If configuration edits are made or an election is made to edit the configuration at 614, the user enters a suitable configuration interface at 618 and the user makes configuration edits which may be stored at 622 to the configuration memory and control passes back to 610.

When the configuration is not to be edited at 614, the processor determines if headphones are plugged in or equivalently active at 618. If not, output audio is provided to the speakers with any suitable user selected speaker equalization at 622. However, if headphones are plugged in or equivalently active at 618, the configuration memory is consulted at 626 to determine if a selection has been made to present the audio signals to the headphones in monaural mode. If so, the audio is output to the headphones at 630 in monaural mode, and in certain implementations, if there is user selected equalization, the monaural mode audio is presented using the user selected equalization at 630. If monaural mode has not been selected for the headphones at 626, the output audio is presented to the headphones in stereo mode at 640, also possibly with separate user selected headphone equalization in certain embodiments. In the case of either 630 or 640, control passes to 644 to determine from the configuration memory 312 whether or not speakers are enabled or muted when the headphones are being used at 644. If the speakers are to be enabled, control passes to 622. If the speakers are not enabled control passes to 650 where the audio signals to the speakers are muted. Whether the audio to the speakers is muted at 650 or not at 622, once the process reaches this point control returns to 614 to monitor the configuration and determine if edits are being made that affect the way the audio is presented.

Thus, a television audio device, consistent with certain example implementations has a multiple channel television audio system having provisions for providing multiple channel audio to a speaker system and multiple channel audio to a multiple channel headphone connection. A switch is configured to detect connection of a multiple channel headphone to the multiple channel headphone connection. Aa processor is selectively programmable to configure the multiple channel television audio system to provide a monaural audio signal to all channels of the multiple channel headphone connection when the multiple channel headphone is connected to the multiple channel headphone connection.

In certain implementations, the processor is further configured to selectively mute audio signals to the speaker system when the multiple channel headphone is connected to the multiple channel headphone connection. In certain implementations, the processor is further configured to selectively equalize the monaural signal on a channel by channel basis to provide individually equalized monaural audio signals to each channel of the multiple channel headphone connection. In certain implementations, the equalized monaural audio signals are equalized on the basis of a user profile associated with a user of the headphones. In certain implementations, the individually equalized monaural audio signals are equalized for audio volume. In certain implementations, the individually equalized monaural audio signals are equalized for audio frequency response. In certain implementations, the processor is further configured to provide equalization to audio signals supplied to the speaker system, and where the equalization of the audio signals supplied to the speaker system is independent of the equalization of the audio signals provided to the multiple channel headphone connection. In certain implementations, the television audio device comprises a television set. In certain implementations, the speakers are integral to the television set. In certain implementations, the television audio device comprises an audio/video receiver. In certain implementations, the speakers are connected to the audio/video receiver. In certain implementations, the multiple channel headphone connection comprises a headphone jack.

Another television audio device has a multiple channel television audio system having provisions for providing multiple channel audio to a speaker system and stereo audio to a stereo headphone jack. A switch is configured to detect connection of a stereo headphone plug into the stereo headphone jack. A processor is selectively programmable to configure the multiple channel television audio system to provide a monaural audio signal to both channels of the stereo headphone jack when the stereo headphone plug is plugged into the stereo headphone jack. The processor is further configured to selectively mute audio signals to the speaker system when the multiple channel headphone plug is plugged into the multiple channel headphone jack.

In certain implementations, the processor is further configured to selectively equalize the monaural signal to each channel on a channel by channel basis to provide individually equalized monaural audio signals to each channel of the stereo headphone jack. In certain implementations, the individually equalized monaural audio signals are equalized for audio volume. In certain implementations, the individually equalized monaural audio signals are equalized for audio frequency response. In certain implementations, the equalized monaural audio signals are equalized on the basis of a user profile associated with a user of the headphones. In certain implementations, the processor is further configured to provide equalization to audio signals supplied to the speaker system, and where the equalization of the audio signals supplied to the speaker system is independent of the equalization of the audio signals provided to the stereo headphone jack.

Another television audio device has a multiple channel television audio system having provisions for providing multiple channel audio to a speaker system and multiple channel audio for receipt by a multiple channel headphone system. A switch is configured to detect operation of the multiple channel headphone system. A processor is selectively programmable to configure the multiple channel television audio system to provide a monaural audio signal to all channels of the multiple channel headphone system when the multiple channel headphone system is detected to be in operation.

A television audio method consistent with certain implementations involves at a multiple channel television audio system having provisions for providing multiple channel audio to a speaker system and multiple channel audio to a multiple channel headphone jack, detecting connection of a multiple channel headphone plug into the multiple channel headphone jack; the one or more processors configuring the multiple channel television audio system to provide a monaural audio signal to all channels of the multiple channel headphone jack when the multiple channel headphone plug is plugged into the multiple channel headphone jack.

In certain implementations, the processor further selectively muting audio signals to the speaker system when the multiple channel headphone plug is plugged into the multiple channel headphone jack. In certain implementations, the processor further selectively equalizes the monaural signal on a channel by channel basis to provide individually equalized monaural audio signals to each channel of the multiple channel headphone jack. In certain implementations, the individually equalized monaural audio signals are equalized for audio volume. In certain implementations, the individually equalized monaural audio signals are equalized for audio frequency response. In certain implementations, the processor further configures equalization to audio signals supplied to the speaker system, and where the equalization of the audio signals supplied to the speaker system is independent of the equalization of the audio signals provided to the multiple channel headphone jack. In certain implementations, the equalized monaural audio signals are equalized on the basis of a user profile associated with a user of the headphones. In certain implementations, the multiple channel headphone jack comprises a stereo headphone jack.

Those skilled in the art will recognize, upon consideration of the above teachings, that certain of the above exemplary embodiments are based upon use of one or more programmed processors. However, the invention is not limited to such exemplary embodiments, since other embodiments could be implemented using hardware component equivalents such as special purpose hardware and/or dedicated processors. Similarly, general purpose computers, microprocessor based computers, micro-controllers, optical computers, analog computers, dedicated processors, application specific circuits and/or dedicated hard wired logic may be used to construct alternative equivalent embodiments.

Certain embodiments described herein, are or may be implemented using one or more programmed processor executing programming instructions that are broadly described above in flow chart form that can be stored on any suitable electronic or computer readable non-transitory storage medium, where the term non-transitory is intended to exclude propagating signals and waves. However, those skilled in the art will appreciate, upon consideration of the present teaching, that the processes described above can be implemented in any number of variations and in many suitable programming languages without departing from embodiments of the present invention. For example, the order of certain operations carried out can often be varied, additional operations can be added or operations can be deleted without departing from certain embodiments of the invention. Error trapping, time outs, etc. can be added and/or enhanced and variations can be made in user interface and information presentation without departing from certain embodiments of the present invention. Such variations are contemplated hereby and considered equivalent.

While certain illustrative embodiments have been described, it is evident that many alternatives, modifications, permutations and variations will become apparent to those skilled in the art in light of the foregoing description.

What is claimed is:

1. A television audio device, comprising:
   a multiple channel television audio system having provisions for providing multiple channel audio to a speaker system and multiple channel audio to a multiple channel headphone connection;
   a switch configured to detect connection of a multiple channel headphone to the multiple channel headphone connection; and
   a processor that is selectively programmable to configure the multiple channel television audio system to provide a monaural audio signal to all channels of the multiple channel headphone connection when the multiple channel headphone is connected to the multiple channel headphone connection.

2. The television audio device according to claim 1, where the processor is further configured to selectively mute audio signals to the speaker system when the multiple channel headphone is connected to the multiple channel headphone connection.

3. The television audio device according to claim 1, where the processor is further configured to selectively equalize the monaural signal on a channel by channel basis to provide individually equalized monaural audio signals to each channel of the multiple channel headphone connection.

4. The television audio device according to claim 3, where the equalized monaural audio signals are equalized on the basis of a stored user profile associated with a user of the headphones under control of the processor.

5. The television audio device according to claim 3, where the individually equalized monaural audio signals are equalized for audio volume.

6. The television audio device according to claim 3, where the individually equalized monaural audio signals are equalized for audio frequency response.

7. The television audio device according to claim 3, where the processor is further configured to provide equalization to audio signals supplied to the speaker system, and where the equalization of the audio signals supplied to the speaker system is independent of the equalization of the audio signals provided to the multiple channel headphone connection.

8. The television audio device according to claim 1, where the television audio device comprises a television set.

9. The television audio device according to claim 8, where the speakers are integral to the television set.

10. The television audio device according to claim 1, where the television audio device comprises an audio/video receiver.

11. The television audio device according to claim 10, where the speakers are connected to the audio/video receiver.

12. The television audio device according to claim 1, where the multiple channel headphone connection comprises a headphone jack.

13. A television audio device, comprising:
a multiple channel television audio system having provisions for providing multiple channel audio to a speaker system and stereo audio to a stereo headphone jack;
a switch configured to detect connection of a stereo headphone plug into the stereo headphone jack;
a processor that is selectively programmable to configure the multiple channel television audio system to provide a monaural audio signal to both channels of the stereo headphone jack when the stereo headphone plug is plugged into the stereo headphone jack; and
where the processor is further configured to selectively mute audio signals to the speaker system when the stereo headphone plug is plugged into the stereo headphone jack.

14. The television audio device according to claim 13, where the processor is further configured to selectively equalize the monaural signal to each channel on a channel by channel basis to provide individually equalized monaural audio signals to each channel of the stereo headphone jack.

15. The television audio device according to claim 14, where the individually equalized monaural audio signals are equalized for audio volume.

16. The television audio device according to claim 14, where the individually equalized monaural audio signals are equalized for audio frequency response.

17. The television audio device according to claim 14, where the equalized monaural audio signals are equalized on the basis of a stored user profile associated with a user of the headphones under control of the processor.

18. The television audio device according to claim 14, where the processor is further configured to provide equalization to audio signals supplied to the speaker system, and where the equalization of the audio signals supplied to the speaker system is independent of the equalization of the audio signals provided to the stereo headphone jack.

19. A television audio device, comprising:
a multiple channel television audio system having provisions for providing multiple channel audio to a speaker system and multiple channel audio for receipt by a multiple channel headphone system;
a switch configured to detect operation of the multiple channel headphone system; and
a processor that is selectively programmable to configure the multiple channel television audio system to provide a monaural audio signal to all channels of the multiple channel headphone system when the multiple channel headphone system is detected to be in operation.

20. A television audio method, comprising:
at a multiple channel television audio system having provisions for providing multiple channel audio to a speaker system and multiple channel audio to a multiple channel headphone jack, detecting connection of a multiple channel headphone plug into the multiple channel headphone jack; and
one or more processors configuring the multiple channel television audio system to provide a monaural audio signal to all channels of the multiple channel headphone jack when the multiple channel headphone plug is plugged into the multiple channel headphone jack.

21. The television audio method according to claim 20, where the processor is further configured to selectively mute audio signals to the speaker system when the multiple channel headphone plug is plugged into the multiple channel headphone jack.

22. The television audio method according to claim 20, where the processor is further configured to selectively equalize the monaural signal on a channel by channel basis to provide individually equalized monaural audio signals to each channel of the multiple channel headphone jack.

23. The television audio method according to claim 22, where the individually equalized monaural audio signals are equalized for audio volume.

24. The television audio method according to claim 22, where the individually equalized monaural audio signals are equalized for audio frequency response.

25. The television audio method according to claim 22, where the processor further configures equalization to audio signals supplied to the speaker system, and where the equalization of the audio signals supplied to the speaker system is independent of the equalization of the audio signals provided to the multiple channel headphone jack.

26. The television audio method according to claim 22, where the equalized monaural audio signals are equalized on the basis of a stored user profile associated with a user of the headphones under control of the one or more processors.

27. The television audio method according to claim 20, where the multiple channel headphone jack comprises a stereo headphone jack.

* * * * *